S. W. RUSHMORE.
STARTER FOR ENGINES.
APPLICATION FILED DEC. 30, 1919.
1,384,971.
Patented July 19, 1921.
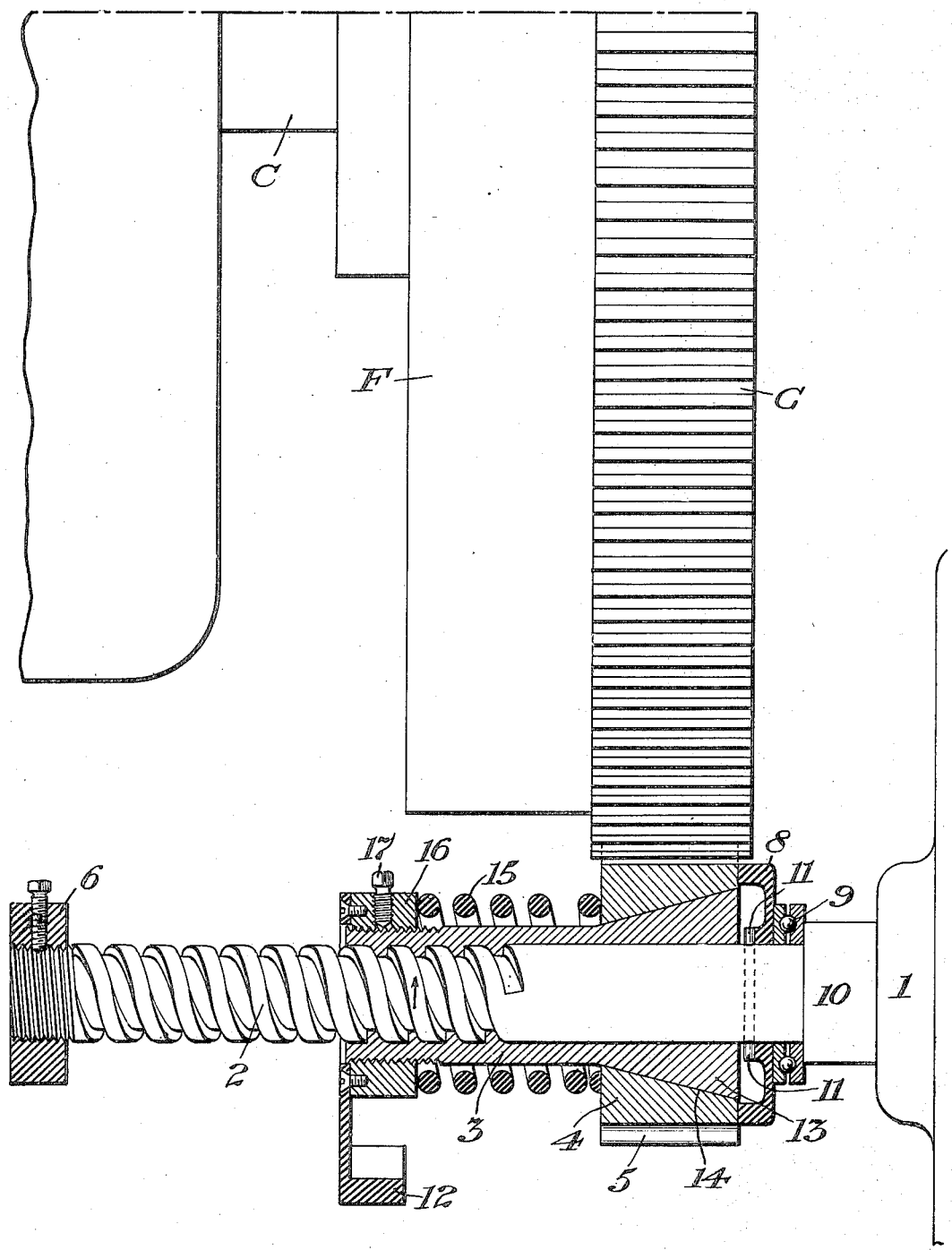
INVENTOR
Samuel W. Rushmore
BY
George C. Dean
HIS ATTORNEY

UNITED STATES PATENT OFFICE.

SAMUEL W. RUSHMORE, OF PLAINFIELD, NEW JERSEY.

STARTER FOR ENGINES.

1,384,971. Specification of Letters Patent. Patented July 19, 1921.

Application filed December 30, 1919. Serial No. 348,356.

*To all whom it may concern:*

Be it known that I, SAMUEL W. RUSHMORE, a citizen of the United States, and resident of Plainfield, in the county of Union and State of New Jersey, have invented certain new and useful Improvements in Starters for Engines, of which the following is a specification.

My present invention relates to devices of the above type in which a motor driven pinion is shifted into driving engagemnt with a gear for rotating the crank shaft of the engine upon starting, and out of engagement after starting. It relates more particularly to devices of the above type in which the pinion is shifted by screwing endwise along a screw element on the driving member, when one rotates faster than the other. Such differential rotation is due to inertia effects upon sudden starting or stopping, either of the motor or the engine, and some auxiliary device such as an eccentric weight or friction drag is commonly employed to retard rotation of the pinion.

In starting devices of the above type employed on automobiles, the power for starting is commonly afforded by an electric motor operating on current derived from the storage battery. Such motors accelerate with extreme rapidity the instant the circuit is closed. Consequently, the endwise screwing of the pinion either into or out of engagement with the engine gear is extremely rapid and the shock upon locking of the gear to rotate with its shaft and the simultaneous taking up of the load is very great. A torque spring may be employed for moderating such shocks as set forth in another application of even date herewith. Such spring when secured to a driving member at one end and to a driven member at the other end permits the driven member to lag behind the driver and thus yieldingly applies the power so as to moderate the shocks.

Such torque springs, however, are noisy and frequently break and one object of my present invention is to secure similar results without the use of the torque spring.

My present invention contemplates the employment in this connection of friction driving means normally acting to apply to the pinion the maximum torque required for starting the engine but so arranged as to afford a certain amount of slip at the instant of excessive shock due to locking of the pinion and simultaneous taking up of the load, when it contacts with the stop which limits its endwise screwing movement.

An additional feature of my invention is organizing the parts in such a way that the endwise screwing elements will function mechanically through suitably related machine elements to automatically effect a slight release of the otherwise normally constant pressure of the friction coupling, thereby permitting slip between the driving and driven members at the instant of abnormal power manifestation due to the momentum of the spinning shaft and armature. Preferably this mechanism is so organized that after such momentary release the full normal pressure on the friction members is automatically restored so that the full power normally available in the motor will be applied for driving the engine at the speed required for starting.

In this device the pinion is not internally screw-threaded but is free for both rotary and longitudinal shift or lag, except as constrained by the friction coupling. The pinion, the thrust spring secured to the latter at one end and the anchorage to which said spring is secured at the other end are all mounted upon a slee e, and said sleeve with all of said elements carried thereby is shifted endwise by screw-threaded engagement with the motor drive shaft. Such endwise shift of the sleeve and parts carried thereby takes effect in a direction to engage the pinion with the gear when the motor speeds up and the pinion lags behind upon initial closing of the motor circuit and the shift in a direction to disengage the pinion occurs when the engine starts, thereby driving the pinion at high speed and causing it to overrun the speed of the motor shaft.

One advantage of this part of my invention is reduction in number and weight of the spinning parts that speed up upon initial closure of the circuit. Such parts must be slowed down nearly or quite to a standstill at the instant the driving pinion screws against the stop and picks up the torque load to start the engine. Such reduction in weight of the spinning parts reduces the strain on the armature shaft and upon the torque spring or other shock absorbing device.

A correlative advantage is decrease in the number and weight of parts that must be accelerated by the motor to cause the endwise shifting of the pinion by the screw element at starting and another correlative advantage is increase in the weight and effective inertia available for causing the pinion to lag behind the drive shaft upon starting, thus making it possible to use a screw element of steeper pitch and thereby shortening the time of the endwise screwing during which the motor and shaft are speeding up under practically no load. Thus the speed and momentum attained by the armature and shaft are kept down, thus materially decreasing the stored up energy that must be dissipated or absorbed by the shock absorbing element when the pinion locks and takes up its load. The same increased weight which gives the above described advantage of inertia on starting gives the correlative advantage of momentum on stopping. When the engine starts and drives the pinion at the overrunning speed, it is the sleeve and thrust spring as well as the pinion which are driven at the high overrunning speed, the result being that the spinning parts have more momentum and spin longer while the armature and attached parts have less momentum and come to rest quicker.

A mechanical advantage is protection of the screw threads from dust and dirt thus permitting better lubrication and closer fitting of the parts with corresponding increase in efficiency of transmission by the gears and decrease in the noise of operation.

The above and other advantages of my invention may be more fully understood from the following detailed description in connection with the accompanying drawings in which the figure is a schematic view partly in section showing the organization of parts according to one desirable embodiment of my invention.

In these drawings the crank shaft C of the internal combustion engine is provided with fly-wheel F having gear G formed on the periphery thereof. In operative relation thereto is the electric starting motor 1, having a screw-threaded armature shaft 2 carrying an internally screw-threaded sleeve 3 carrying the pinion 4 provided with gear teeth 5. The motor shaft is parallel with the crank shaft so that screwing of the sleeve endwise along the shaft brings the pinion into and out of mesh with the gear teeth on the fly-wheel. Outward movement of the sleeve is limited by a collar 6 at the end of the armature shaft and inward movement of the pinion 4 is limited by a cup-shaped collar 8 mounted for free rotation on the shaft and adapted to contact with end face of pinion 4. A roller thrust bearing 9 may be provided between the collar 8 and the shaft collar 10 and the parts may be held in place by pins 11, 11, driven into shaft 2.

Inertia of the parts will operate to retard rotation of the sleeve to screw it inward when the drive shaft starts and momentum of the same parts will operate to keep up their overrunning speed when starting of the engine operates to drive the pinion faster than the motor shaft. If desired, however, the sleeve may be provided with an eccentric weight 12 to assist inertia in retarding rotation of the sleeve when the starting circuit is closed; to decrease oscillation when the parts are speeded up and shifted endwise by the starting of the engine and to prevent the sleeve from screwing toward the fly-wheel on steep grades. Any suitable means may be employed for closing the circuit of the motor as for instance a switch connected in series with a battery.

It will be noted that although the screw threads are cut directly in the armature shaft, the threads do not extend to within several inches of the collar 10. Therefore the shaft is not weakened at all at the point where radial shock and strain are applied by the pinion.

The means for frictionally applying the desired torque from the sleeve 3 to the pinion 4 consists of the friction cone 13 integral with sleeve 3 and the coöperating internally coned surface 14 within the pinion 4. The pinion 4 is forced into frictional engagement with the cone 13 by means of a heavy thrust spring 15 which thrusts against screw collar 16 which is locked on sleeve 3 by screw 17. The area of the frictional surface and the stiffness of spring 15 are predetermined with a view to transmitting from shaft 2 to pinion 4 the maximum torque required for rotating gear wheel G up to the starting speed.

It will be noted that spring 15 is not secured either to the driving or driven member and serves none of the functions of a torque spring; also the pinion 4 is secured to the sleeve 3 only by pressure of said spring 15 forcing friction surface 14 into contact with 13. Hence, said sleeve can be shifted endwise to the left to relieve the friction if sufficient power be applied to compress the spring 15. Moreover, said sleeve may slip and rotate at slower speed or even remain stationary while shaft 2 is rotating whenever sufficient power is applied to overcome the normal friction or when said friction is reduced or eliminated by the above described endwise movement of the sleeve to the left in opposition to the pressure of spring 15.

From the above description of the parts the operation of the device will be readily understood. When the starting switch is closed the armature shaft 2 will be rotated. Rotation of the sleeve 3 and pinion 4 will be prevented or at least retarded by their inertia assisted by the eccentric weight 12. Hence the sleeve will screw endwise carrying the pinion into mesh with gear G. Should the gear teeth happen to meet end-on, the spring 15 will yield slightly and permit a slight movement sufficient to permit proper engagement. The starting speed of the motor being very great and practically unimpeded up to the moment when the gear 4 butts against collar 8 and the pinion 4 being then practically stationary and in mesh with stationary fly-wheel gear G, there is an instant when the momentum stored up in the rapidly rotating armature and shaft apply an abnormally excessive torque. With the arrangement shown in the drawings, the effect of this is to tend to screw the sleeve still farther to the right, thus tending to relieve the frictional pressure between surfaces 13 and 14. This permits the pinion to lag behind the sleeve and drive shaft during the time needed to take up the shock and start the fly-wheel of the engine. The pressure of spring 15 being constant, will operate automatically to restore cone 13 to full frictional engagement with surface 14 of pinion 4 as soon as the abnormal or shock conditions have been equalized by getting the fly-wheel of the engine in motion and corresponding slowing down of the motor armature.

It will be understood that the above described endwise relieving movements are likely to be minute and in many cases will manifest themselves merely as decrease of pressure of the frictional surfaces rather than as observable movements of the sleeve.

It will be evident also that if the pressure of spring 15 be properly gaged so as to afford a closely regulated pressure slightly greater than the maximum normal torque, the friction surfaces may slip sufficient to take up the shock without any endwise movement of the sleeve 3.

I claim:

1. In an engine starter of the type including an electric starting motor, a shaft driven thereby, a screw element rotated by said shaft, an endwise shiftable screw element and a pinion associated therewith, adapted to be shifted endwise to move the pinion into and out of engagement with a gear for starting the engine according as said first named screw element rotates faster or slower than said pinion, and, in combination with said parts, and mounted on said driven shaft, a friction element connected for rotary drive and endwise shift by said shiftable screw-threaded element, a friction element on said pinion engaged by the latter, a thrust spring for normally maintaining said friction elements in frictional engagement sufficient for driving the pinion at speed required for starting the engine, and a stop for preventing further endwise shift of the pinion after it comes into full engagement with the gear wheel while permitting further endwise shift of said endwise shiftable screw element and the friction element carried thereby, whereby the latter may screw endwise to permit slip of said pinion after its engagement with said stop.

2. In the combination specified by claim 1, the further feature of having said friction elements formed as cones.

3. In the combination specified by claim 1, the further feature of having the stop in the form of a cup shaped collar rotatable on said shaft and having its rim presented for engagement by said pinion and its cup shaped cavity presented so as to afford space for the further endwise shift of the friction element which drives the pinion.

4. In the combination specified by claim 1, the further feature of having the endwise shiftable screw element in the form of a sleeve and the friction element for driving the pinion, rigidly connected with said sleeve.

Signed at Plainfield in the county of Union and State of New Jersey this 27 day of December, A. D. 1919.

SAMUEL W. RUSHMORE.